(12) United States Patent
Fujita et al.

(10) Patent No.: US 9,643,644 B2
(45) Date of Patent: May 9, 2017

(54) ACTUATOR AND VEHICLE STEERING DEVICE

(71) Applicant: Showa Corporation, Gyoda-shi (JP)

(72) Inventors: Hiroshi Fujita, Haga-gun (JP); Shinichi Sakaida, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 30 days.

(21) Appl. No.: 14/723,174

(22) Filed: May 27, 2015

(65) Prior Publication Data

US 2016/0176437 A1    Jun. 23, 2016

(30) Foreign Application Priority Data

Dec. 19, 2014  (JP) ................................. 2014-257571

(51) Int. Cl.
*B62D 5/04*    (2006.01)
*B62D 7/15*    (2006.01)
*B62D 7/22*    (2006.01)

(52) U.S. Cl.
CPC ......... *B62D 5/0433* (2013.01); *B62D 7/1581* (2013.01); *B62D 7/228* (2013.01)

(58) Field of Classification Search
CPC ........... B62D 5/0421; B62D 3/06; B62D 3/10
USPC ................................ 180/444, 445
See application file for complete search history.

(56) References Cited

U.S. PATENT DOCUMENTS

| 5,746,350 A | * | 5/1998 | Nishigami | .......... B05B 11/0043 222/105 |
| 5,899,294 A | * | 5/1999 | Shimizu | ................ B62D 5/043 180/443 |
| 7,878,512 B2 | * | 2/2011 | Horiuchi | ................ B60G 7/006 180/410 |
| 2003/0006120 A1 | | 1/2003 | Yoshida et al. | |

(Continued)

FOREIGN PATENT DOCUMENTS

| JP | 2003-081106 A | 3/2003 |
| JP | 2003-237614 A | 8/2003 |

(Continued)

OTHER PUBLICATIONS

U.S. Appl. No. 14/723,142, filed May 27, 2015, Fujita et al.
U.S. Appl. No. 14/721,998, filed May 26, 2015 Fujita et al.

*Primary Examiner* — Tony Winner
(74) *Attorney, Agent, or Firm* — Leason Ellis LLP

(57) ABSTRACT

An actuator includes a motor, a rotation transmitting member, a reverse input preventing device, a converting device, and a rod. The motor includes a rotating shaft. The rotation transmitting member is configured to transmit rotation of the rotating shaft. The reverse input preventing device includes an input member and an output member. The reverse input preventing device is configured to prevent external force input to the output member from being transmitted to the input member. The converting device includes a nut that rotates according to the rotation of the output member. The converting device is configured to convert a rotary motion of the nut into a linear motion. The rod is configured to advance and retract according to the linear motion of the converting device. The input member and the rotation transmitting member are integrated. The output member and the nut are integrated.

9 Claims, 9 Drawing Sheets

(56) References Cited

U.S. PATENT DOCUMENTS

| | | | | |
|---|---|---|---|---|
| 2004/0003956 A1* | 1/2004 | Furumi | ............... | B62D 7/148 180/445 |
| 2016/0121922 A1* | 5/2016 | Fujita | ............... | B62D 5/0448 74/89.39 |
| 2016/0185383 A1 | 6/2016 | Fujita et al. | | |

FOREIGN PATENT DOCUMENTS

| | | |
|---|---|---|
| JP | 2009-243621 A | 10/2009 |
| JP | 2014-25122 | 12/2014 |

\* cited by examiner

ACTUATOR AND VEHICLE STEERING DEVICE

CROSS-REFERENCE TO RELATED APPLICATIONS

This application is based on and claims priority under 35 USC 119 from Japanese Patent Application No. 2014-257571 filed on Dec. 19, 2014, the entire content of which is incorporated herein by reference.

BACKGROUND OF THE INVENTION

1. Field of the Invention

The present invention relates to an actuator and a vehicle steering device.

2. Description of the Related Art

Four-wheel vehicles in recent years often include a vehicle steering device for rear wheels in order to control a steering angle of the rear wheels to a desired angle according to a traveling state.

As the vehicle steering device, there are a left-right integrated type for integrally steering left and right wheels with one actuator and a left-right independent type for providing actuators on the left and right side, respectively, and steering the left and right wheels independently from each other.

The actuator used in the vehicle steering device of the left-right independent type includes, in general, a telescopic rod, a motor including a rotating shaft, a worm gear and a worm wheel that reduce rotating speed of the rotating shaft, and a converting device (a ball screw or a feed screw) that converts a rotary motion of the worm wheel into a linear motion of the rod and advances and retracts the rod (see Japanese Patent Application Laid-open No. 2009-243621 (Patent Literature 1)). The actuator changes a projection amount of the rod to control steering angles of the wheels.

Incidentally, in some case, the wheels receive a load from a road surface during traveling of the vehicle and external force is input in the axial direction of the rod. When the external force is transmitted to the converting device, the worm wheel, the worm gear, and the motor, it is likely that the strength of the components is deteriorated and the projection amount of the rod changes.

Because of such circumstance, in Japanese Patent Application Laid-open No. 2003-237614 (Patent Literature 2) and Japanese Patent Application Laid-open No. 2003-81106 (Patent Literature 3), a reverse input preventing device is provided on a transmission route of driving force of the motor to prevent the input external force from being transmitted to the motor side.

Note that the reverse input preventing device includes an input member connected to components on an input side on the transmission route of the driving force and an output member connected to components on an output side.

Patent Literature 1: Japanese Patent Application Laid-open No. 2009-243621

Patent Literature 2: Japanese Patent Application Laid-open No. 2003-237614

Patent Literature 3: Japanese Patent Application Laid-open No. 2003-81106

However, when the reverse input preventing device is provided in the actuator as in the related art, the number of components such as ball bearings for rotatably supporting the input member and the output member increases.

SUMMARY OF THE INVENTION

The present invention has been devised in order to solve such a problem and it is an object of the present invention to provide an actuator and a vehicle steering device that include a reverse input preventing device and can attain a reduction in the number of components.

In order to solve the problem, a first actuator according to the present invention includes: a motor including a rotating shaft; a rotation transmitting member configured to transmit rotation of the rotating shaft; a reverse input preventing device including an input member and an output member that rotate according to rotation of the rotation transmitting member, and configured to prevent external force input to the output member from being transmitted to the input member; a converting device including a nut that rotates according to the rotation of the output member, and configured to convert a rotary motion of the nut into a linear motion; and a rod configured to advance and retract according to the linear motion of the converting device. The input member and the rotation transmitting member are integrated with each other, and the output member and the nut are integrated with each other.

In order to solve the problem, a second actuator according to the present invention includes: a motor including a rotating shaft; a worm gear coupled to the rotating shaft; a worm wheel meshed with the worm gear; a reverse input preventing device including an input member and an output member that rotate according to rotation of the worm wheel, and configured to prevent external force input to the output member from being transmitted to the input member; a converting device including a nut that rotates according to the rotation of the output member, and configured to convert a rotary motion of the nut into a linear motion; and a rod configured to advance and retract according to the linear motion of the converting device. The input member and the worm wheel are integrated with each other, and the output member and the nut are integrated with each other.

In order to solve the problem, a vehicle steering device according to the present invention is a vehicle steering device including an actuator including a rod that advances and retracts, wheels of a vehicle being steered by the advancement and the retraction of the rod. The actuator includes: the rod; a motor including a rotating shaft; a rotation transmitting member configured to transmit rotation of the rotating shaft; a reverse input preventing device including an input member and an output member that rotate according to rotation of the rotation transmitting member, and configured to prevent external force input to the output member from being transmitted to the input member; and a converting device including a nut that rotates according to the rotation of the output member, and configured to convert a rotary motion of the nut into a linear motion of the rod. The input member and the rotation transmitting member are integrated with each other, and the output member and the nut are integrated with each other.

According to the present invention, since the input member and the rotation transmitting member (or the worm wheel) are integrated with each other, a bearing for rotatably supporting the rotation transmitting member (or the worm wheel) is unnecessary. Since the output member and the nut are integrated with each other, a ball bearing or the like for rotatably supporting the output member is unnecessary. Consequently, it is possible to attain a reduction in the number of components.

BRIEF DESCRIPTION OF THE DRAWINGS

FIG. 1 is a rear view of a suspension device of a left rear wheel of a four-wheel vehicle;

FIG. 2 is a II-II line arrow sectional view of FIG. 3;

DETAILED DESCRIPTION OF THE INVENTION

An embodiment of the present invention is explained with reference to the drawings as appropriate. In the explanation of the embodiment, an example is explained in which the present invention is applied to a vehicle steering device that steers rear wheels of a four-wheel vehicle.

The four-wheel vehicle is a four-wheel drive vehicle of a front-engine front-drive (FF) base.

Figure 1:
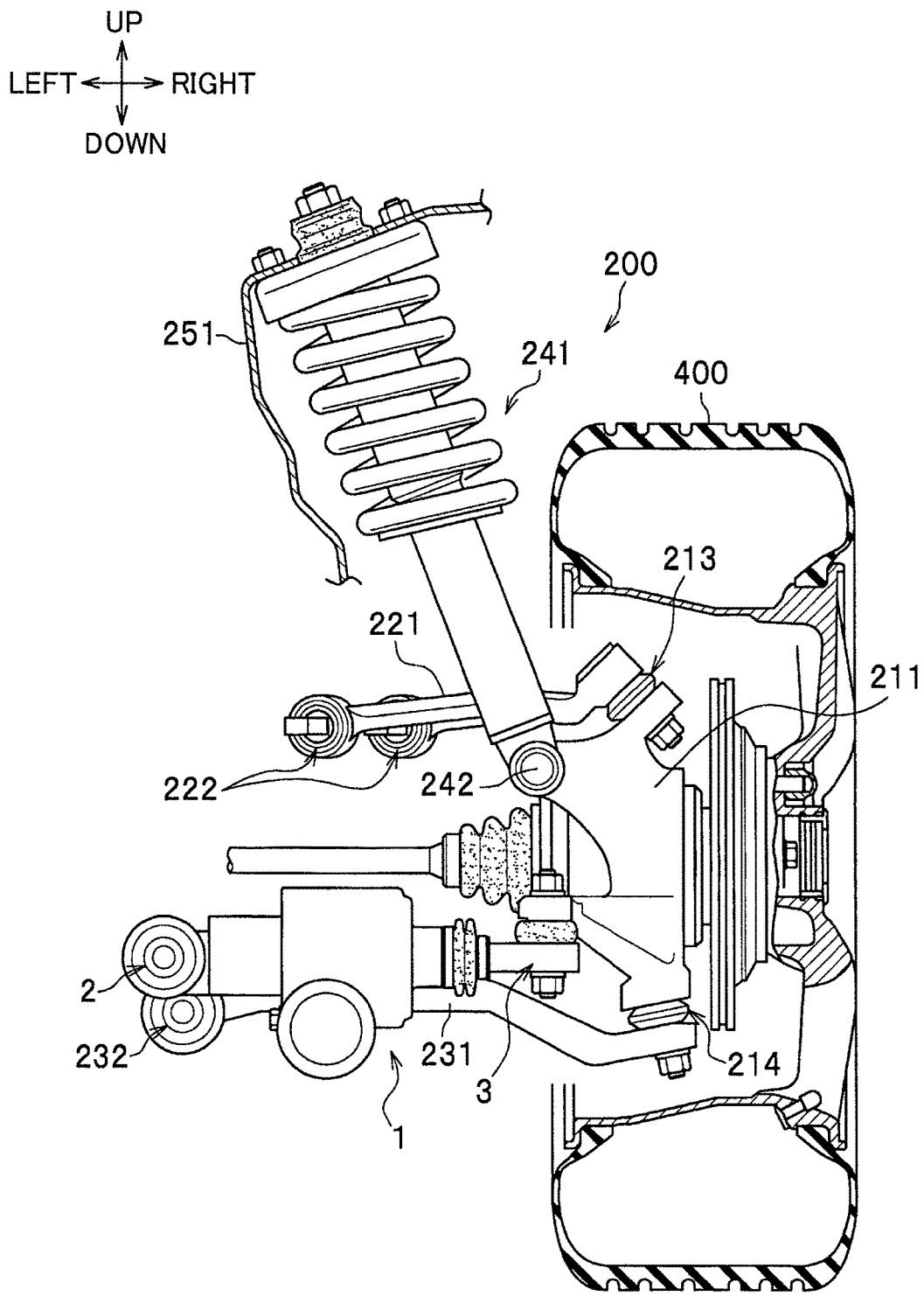

As shown in FIG. 1, a rear wheel 400 of the four-wheel vehicle is supported by a suspension device 200 configured in a double wishbone type.

The suspension device 200 includes a knuckle 211 configured to rotatably support the rear wheel 400, an upper arm 221 and a lower arm 231 configured to couple the knuckle 211 to a vehicle body to be capable of moving up and down, a suspension spring-equipped damper 241 configured to damp up-down movements of the rear wheel 400, an actuator 1 configured to turn the knuckle 211 and change a steering angle of the rear wheel 400, and a control unit (not shown in the figure) configured to control the actuator 1.

An upper part of the knuckle 211 is turnably coupled to the distal end portion of the upper arm 221 via a ball joint 213. A lower part of the knuckle 211 is turnably coupled to the distal end portion of the lower arm 231 via a ball joint 214. The knuckle 211 turns about the ball joints 213 and 214, whereby the steering angle of the rear wheel 400 changes.

The base of the upper arm 221 is turnably attached to the vehicle body via two bushes 222. The base of the lower arm 231 is turnably attached to the vehicle body via two bushes 232 (only one is shown in FIG. 1). The upper arm 221 and the lower arm 231 turn about the base sides, whereby the rear wheel 400 moves up and down.

The damper 241 is a hydraulic damper (a hydraulic draft gear) equipped with a spring. An upper part of the damper 241 is fixed to a vehicle body 251. A lower part of the damper 241 is coupled to the knuckle 211 via a bush 242.

The end portion on the vehicle width direction inner side of the actuator 1 is coupled to the vehicle body via a bush 2. On the other hand, the end on the vehicle width direction outer side of the actuator 1 is coupled to the knuckle 211 via a bush 3. Therefore, the actuator 1 is interposed between the vehicle body and the knuckle 211.

Figure 2:
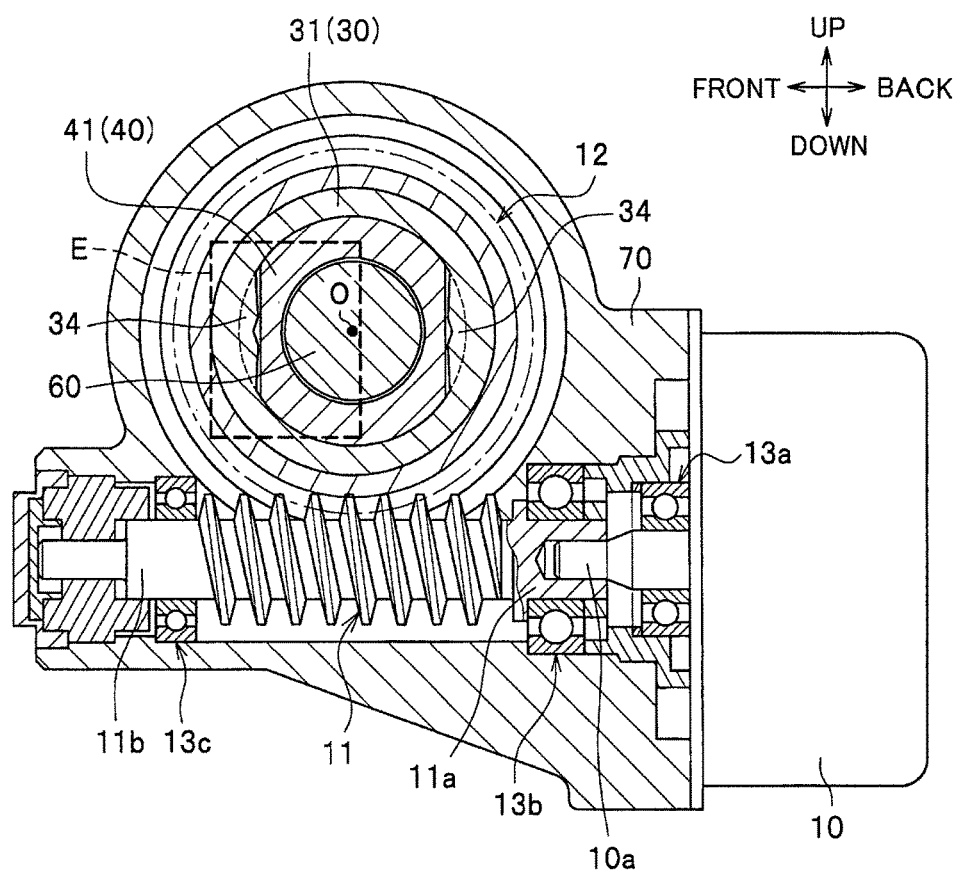
Figure 3:
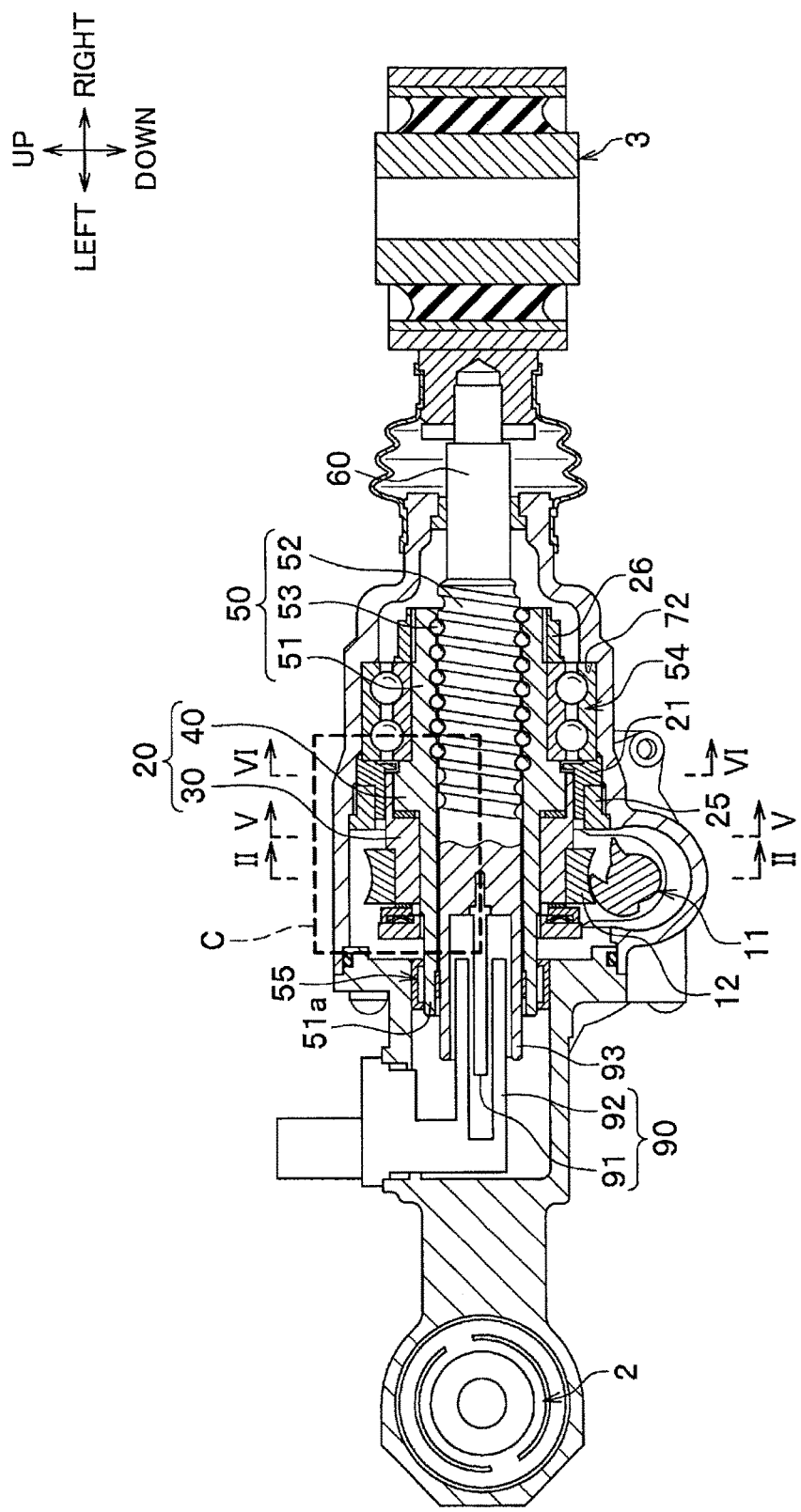
FIG. 3 is a sectional view of an actuator.

As shown in FIGS. 2 and 3, the actuator 1 includes a motor 10 including a rotating shaft 10a, a worm gear 11 coupled to the rotating shaft 10a, a worm wheel 12 meshed with the worm gear 11, a reverse input preventing device 20 including an input member 30 and an output member 40 that rotate according to the rotation of the worm wheel 12, a converting device 50 including a nut 51 that rotates according to the rotation of the output member 40, a rod 60, and a housing 70 configured to house the components.

As shown in FIG. 2, the motor 10 is a device in which the rotating shaft 10a rotates according to a control signal received from the control unit (not shown in the figure) to generate driving force for advancing and retracting the rod 60.

The motor 10 is fixed to the housing 70 to direct the rotating shaft 10a forward. Note that the rotating shaft 10a of the motor 10 is rotatably supported by a ball bearing 13a provided in the housing 70.

The worm gear 11 and the worm wheel 12 are rotation transmitting members for decelerating the rotary motion of the rotating shaft 10a and transmitting the rotation of the rotating shaft 10a of the motor 10 to the input member 30.

The rotating shaft 10a of the motor 10 fits with a base 11a of the worm gear 11. The rotating shaft 10a and the worm gear 11 integrally rotate. The base 11a and a distal end 11b of the worm gear 11 are rotatably supported by ball bearings 13b and 13c. The rotation axis of the worm gear 11 is less easily decentered.

A cylindrical input member 30 is disposed in the worm wheel 12. A cylindrical output member 40 is disposed in the input member 30.

The input member 30 is a member for transmitting driving force of the motor 10, which is transmitted from the worm wheel 12, to the output member 40.

Figure 4:
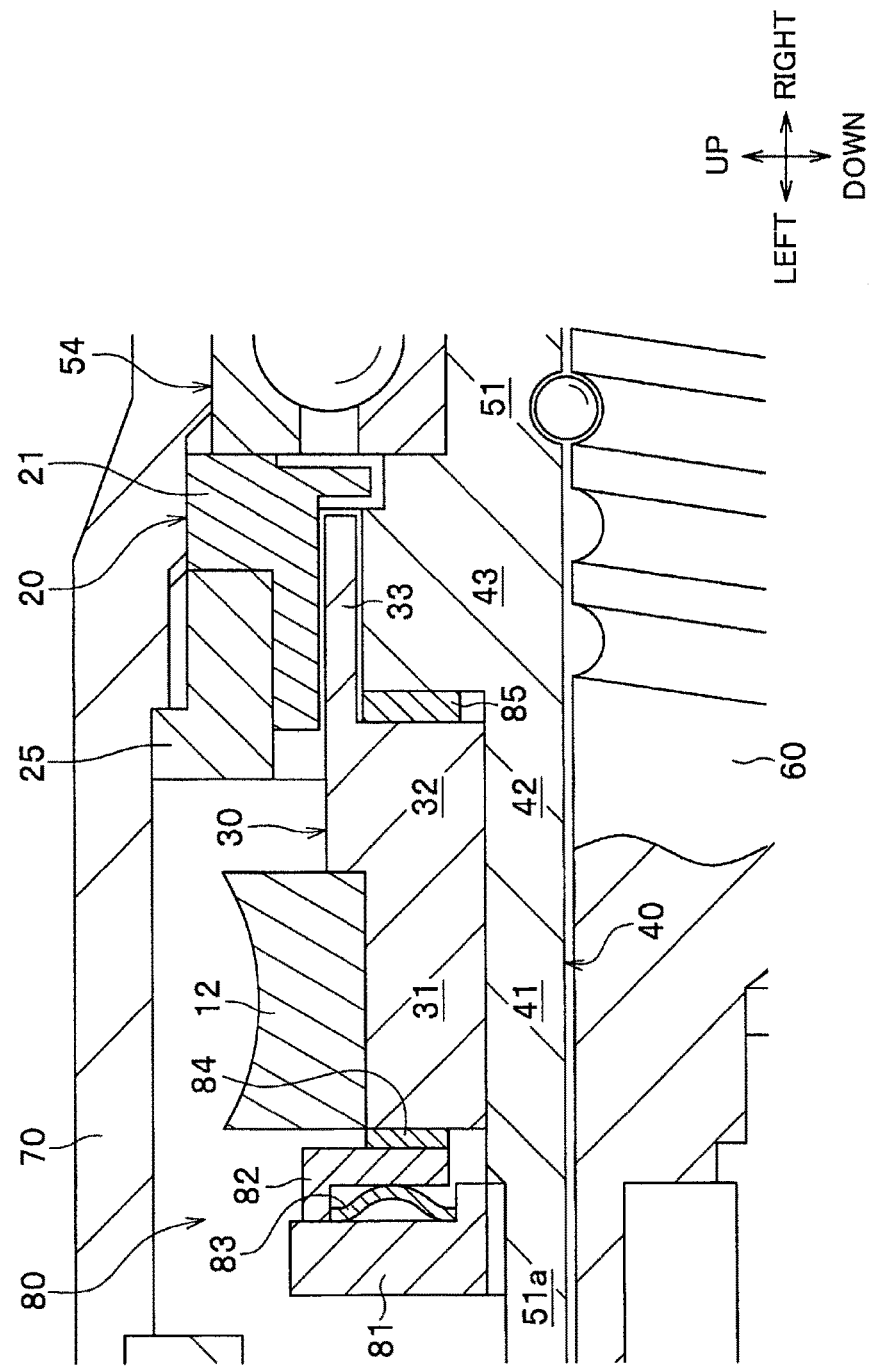
FIG. 4 is an enlarged view of a range surrounded by a frame line C in FIG. 3.

As shown in FIG. 4, the input member 30 includes a substantially cylindrical fixed section 31 internally fit in the worm wheel 12, a cylindrical section 32 provided on the vehicle width direction outer side from the fixed section 31, a plurality of claws 33 extending to the vehicle width direction outer side from the cylindrical section 32, and driving-force transmitting sections 34 (see FIG. 2) projecting to the radial direction inner side from the inner circumferential surface of the fixed section 31.

The fixed section 31 is internally fit in the worm wheel 12 before assembling of the actuator 1. The input member 30 and the worm wheel 12 are integrated (see FIG. 7). Therefore, in manufacturing of the actuator 1, the input member 30 and the worm gear 11 can be assembled as one component. After the assembling, when the worm gear 11 rotates, the worm wheel 12 and the input member 30 integrally rotate.

Note that the components other than the fixed section 31 are explained in detail below.

The output member 40 is a member for transmitting the driving force of the motor 10, which is transmitted from the input member 30, to the nut 51 of the converting device 50.

As shown in FIG. 4, the output member 40 includes a driving-force transmitted section 41 located at the inner side of the fixed section 31 of the input member 30, an axial support section 42 located at the inner side of the cylindrical section 32 and configured to support the cylindrical section 32 rotatably about an axis of the cylindrical section 32, and a lock section 43 provided on the vehicle width direction outer side of the axial support section 42.

Note that the components are explained in detail below.

The nut 51 having a spiral groove on the inner circumference side thereof is provided on the vehicle width direction outer side of the lock section 43 of the output member 40.

On the other hand, a substantially cylindrical extending section 51a configuring a part of the nut 51 is provided on the vehicle width direction inner side of the driving-force transmitted section 41 of the output member 40.

Figure 7:
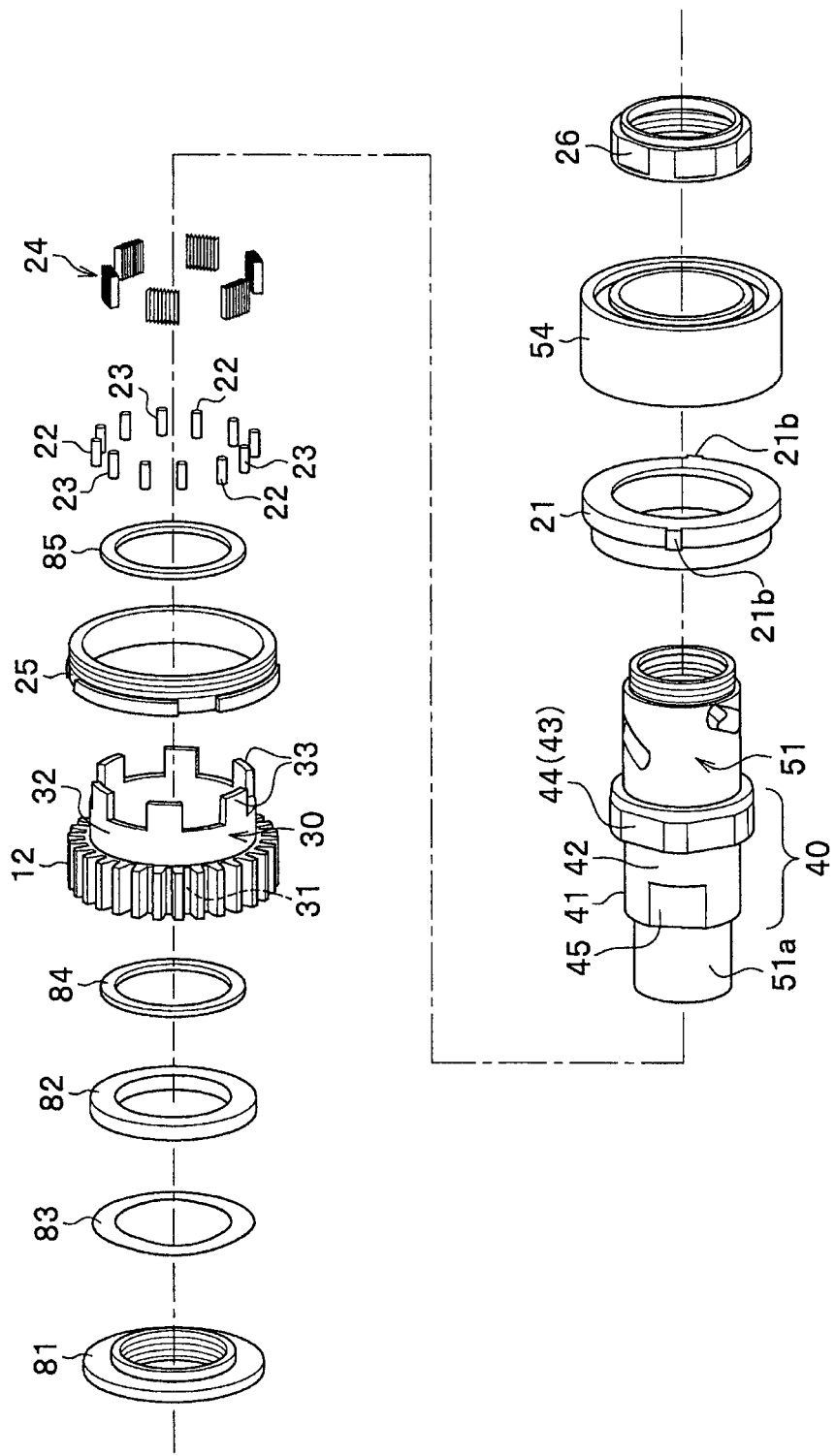
FIG. 7 is an exploded perspective view of components assembled to an outer circumference side of an output member and a nut.

The nut 51 (including the extending section 51a) and the output member 40 are formed by, for example, cutting one SUS material or the like (see FIG. 7). Therefore, the output member 40 and the nut 51 are integrated. When the driving force of the motor 10 is transmitted from the input member 30, the output member 40 and the nut 51 integrally rotate.

As shown in FIG. 3, the converting device 50 is a device for converting a rotary motion of the nut 51 into a linear motion. In this embodiment, the converting device 50 is configured by a ball screw.

The converting device 50 in this embodiment includes a substantially cylindrical nut 51 having a spiral groove on the inner circumferential surface thereof, a substantially columnar screw shaft 52 having a spiral groove on the outer circumferential surface thereof, and a plurality of balls 53 housed in both of the spiral groove of the nut 51 and the spiral groove of the screw shaft 52.

The nut 51 is internally fit in the inner ring of the ball bearing 54 internally fit in the housing 70. The extending section 51a configuring the nut 51 is internally fit in the roller bearing 55 internally fit in the housing 70. Therefore, both the ends of the nut 51 are rotatably supported by the ball bearing 54 and the roller bearing 55. The nut 51 and the output member 40 are rotatably fixed in the housing 70.

A lock nut 26 (see FIG. 7) is screwed in the outer circumferential surface on the vehicle width direction outer side of the nut 51.

The lock nut 26 is in contact with the inner ring of the ball bearing 54 from the vehicle width direction outer side. The nut 51 is regulated not to positionally shift to the vehicle width direction inner side.

Further, a step section 72 of the housing 70 is in contact with an outer ring of the ball bearing 54. The ball bearing 54 is regulated not to move to the vehicle width direction outer side.

The screw shaft 52 is formed integrally with the rod 60 disposed on the vehicle width direction outer side. When the screw shaft 52 moves to the outer side or the inner side in the vehicle width direction according to the rotation of the nut 51, a projection amount of the rod 60 projecting from the housing 70 changes and the steering angle of the rear wheel 400 changes.

The screw shaft 52 is formed integrally with the rod 60 disposed on the vehicle width direction outer side. When the screw shaft 52 moves to the outer side or the inner side in the vehicle width direction according to the rotation of the nut 51, the projection amount of the rod 60 projecting from the housing 70 changes.

In this embodiment, when the projection amount of the rod 60 increases, the rear wheel 400 turns to a toe-in side. On the other hand, when the projection amount of the rod 60 decreases, the actuator 1 contracts and the rear wheel 400 turns to a toe-out side.

Further, a bottomed cylindrical section 93 is formed on the vehicle width direction inner side of the screw shaft 52.

A detected section 91 and a detecting section 92 are housed in the bottomed cylindrical section 93. Therefore, an occupied space of a stroke sensor 90 in the housing 70 is narrowed and the actuator 1 is reduced in size.

The reverse input preventing device 20 is a device for preventing external force, which is input to the output member 40 via the rod 60, from being transmitted to the input member 30.

Figure 6:
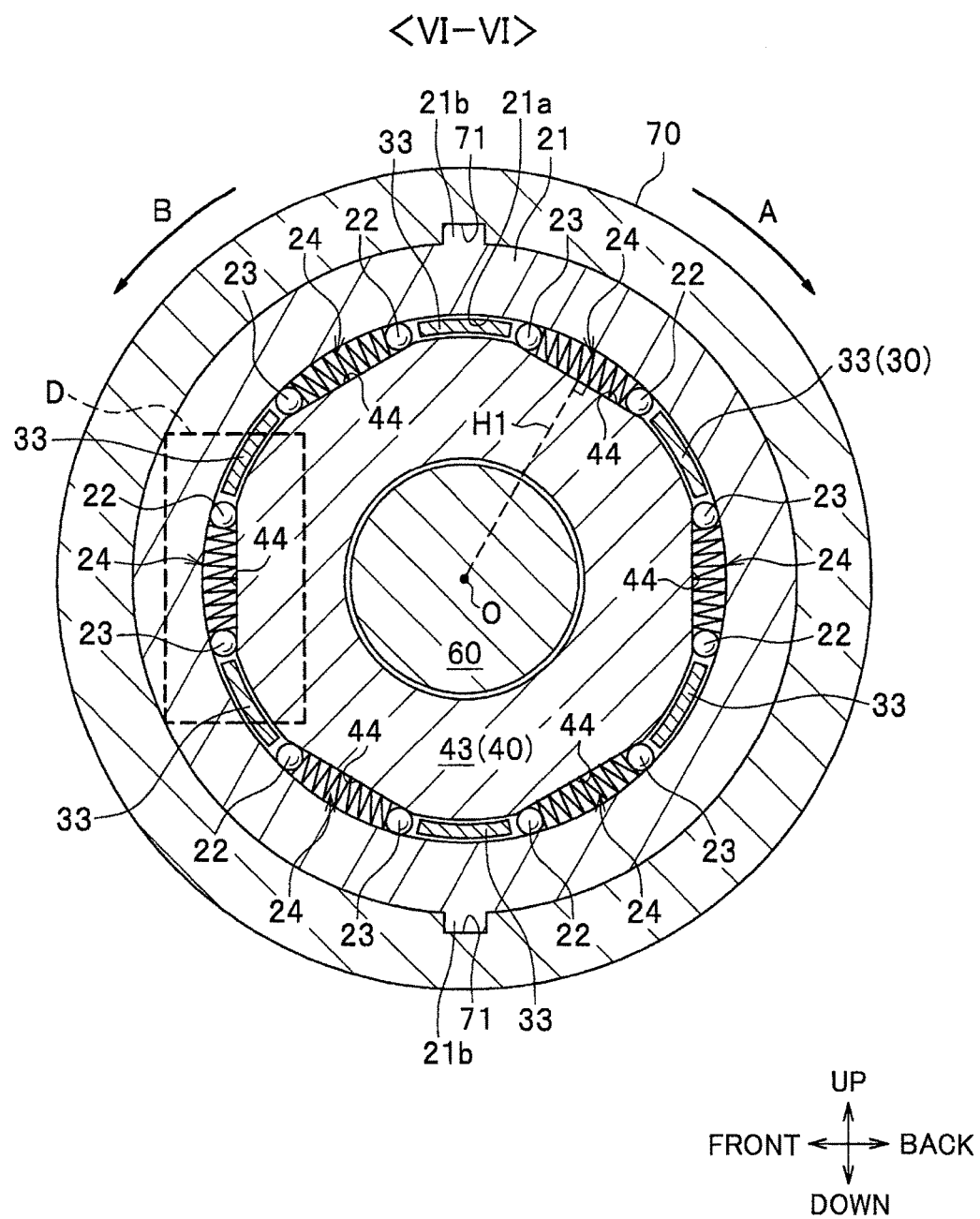
FIG. 6 is a VI-VI line arrow sectional view of FIG. 3.

As shown in FIG. 6, the reverse input preventing device 20 includes the output member 40 including the lock section 43 on which a plurality of flat surfaces 44 are formed, an outer case (an outer circumferential wall section) 21 on which a substantially circular inner circumferential surface 21a surrounding the outer circumference of the lock section 43 is formed, pairs of pins 22 and 23 disposed between the flat surfaces 44 and the inner circumferential surface 21a, a plurality of elastic bodies 24 disposed among the pairs of pins 22 and 23, the input member 30 including the plurality of claws 33, and an attaching section 80 (see FIG. 4).

In the following explanation, a reference direction is a direction from the inner side to the outer side in the vehicle width direction with respect to a rotating direction (a turning direction). Therefore, "right turn" is a direction indicated by an arrow A in FIG. 6 and "left turn" is a direction indicated by an arrow B in FIG. 6.

The outer case 21 is a substantially cylindrical member (see FIG. 7). In the outer case 21, two protrusions 21b projecting to the radial direction outer side from the outer circumferential surface are formed. The protrusions 21b fit in recesses 71 formed in the housing 70. The outer case 21 is prevented from turning in the circumferential direction with respect to the housing 70.

Further, as shown in FIG. 4, a fixed screw 25 screwed in the housing 70 is disposed on the vehicle width direction inner side of the outer case 21. The outer case 21 is tightened to the vehicle width direction outer side by the fixed screw 25.

Therefore, as shown in FIG. 3, the outer case 21 and the ball bearing 54 adjacent to the outer case 21 are sandwiched by the fixed screw 25 and the step section 72 of the housing 70 and fixed to the housing 70 not to move in the vehicle width direction.

As shown in FIG. 6, the plurality of flat surfaces 44 are formed at an interval of approximately 60 degrees on the outer circumferential surface of the lock section 43. Note that, in this embodiment, the flat surfaces 44 are formed at the interval of approximately 60 degrees. However, the present invention is not limited to this.

The flat surface 44 is orthogonal to a straight line H1 that passes a center axis O of the rod 60. Therefore, as shown in FIG. 8, width L1 between the flat surface 44 and the inner circumferential surface 21a of the outer case 21 gradually decreases from a center portion 44a of the flat surface 44 toward a right end portion 44b side and a left end portion 44c side (both end sides) of the flat surface 44.

The pairs of pins 22 and 23 are columnar members (see FIG. 7).

Figure 8A:
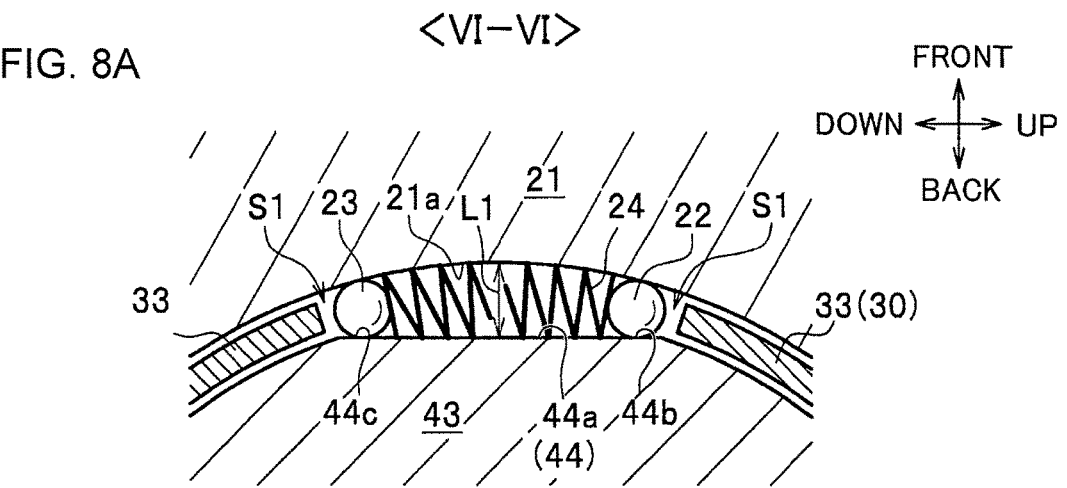
FIG. 8A is an enlarged view of a range surrounded by a frame line D in FIG. 6 in an unrotatable state of an output ember.

Note that, among the pairs of pins 22 and 23, pins disposed in the right turn direction with reference to the elastic bodies 24 as shown in FIG. 8 are referred to as right side pins 22 and pins disposed in the left turn direction are referred to as left side pins 23.

The elastic bodies 24 are bellows-like leaf springs (see FIG. 7) and provided among the pairs of pins 22 and 23 in a contracted state. Therefore, each of the pairs of pins 22 and 23 always urged to separate in the circumferential direction by the elastic bodies 24 is sandwiched in a narrowed space between the right end portion 44b of the flat surface 44 and the inner circumferential surface 21a and between the left end portion 44c and the inner circumferential surface 21a to disable turning of the output member 40.

As a result, since the output member 40 does not turn even if external force is input to the rod 60, the external force is not transmitted to the input member 30 from the output member 40.

The claws 33 of the input member 30 are formed in an arcuate shape in sectional view. The claws 33 turn in the circumferential direction according to the turn of the worm wheel 12 and press any one of the pairs of pins 22 and 23.

Specifically, when the worm wheel 12 turns to the right, the claws 33 press the left side pins 23 to the right against urging force of the elastic bodies 24. Therefore, the left side pins 23 sandwiched between the left end portion 44c of the flat surface 44 and the inner circumferential surface 21a move to the center portion 44a of the flat surface 44. The unturnable state of the right turn of the lock section 43 (the output member 40) is released.

Note that the right side pins 22 not pressed by the claws 33 are maintained in the state in which the right side pins 22 are sandwiched between the right end portion 44b of the flat surface 44 and the inner circumferential surface 21a. Therefore, the unturnable state of the left turn of the lock section 43 (the output member 40) is also maintained.

The claws 33 are spaced apart in the circumferential direction from the pairs of pins 22 and 23 disposed on the circumferential direction both sides of the claws 33. A gap S1 is formed between the claws 33 and the pairs of pins 22 and 23. Therefore, even if the claws 33 (the input member 30) vibrate (move) in the circumferential direction because of vibration during traveling, the unturnable state of the lock section 43 (the output member 40) is not released.

The driving-force transmitting sections 34 are parts that move in the circumferential direction according to the rotation of the input member 30 and press the driving-force transmitted section 41 of the output member 40 in the circumferential direction.

As shown in FIG. 2, the driving-force transmitting sections 34 are provided to shift 180 degrees on the inner circumference side of the fixed section 31 and are opposed to each other.

Figure 9A:
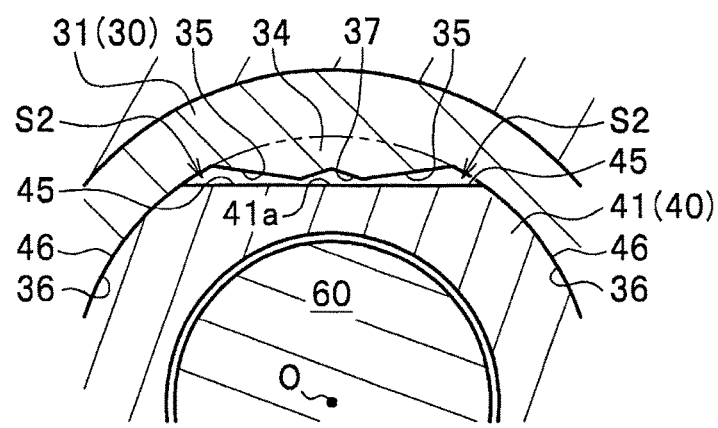
FIG. 9A is an enlarged view of a range surrounded by a frame line E in FIG. 2 in a state before rotation of an input member.

On the other hand, as shown in FIG. 9A, a flat surface 41a is formed in a portion opposed to the driving-force transmitting section 34 on the outer circumferential surface of the driving-force transmitted section 41.

Note that, on the outer circumferential surface of the driving-force transmitted section 41, in portions not opposed to the driving-force transmitting section 34, outer circumferential arcuate surfaces 46 in contact with inner circumferential arcuate surfaces 36 of the fixed section 31 are formed.

On both the end sides of the inner circumferential surface of the driving-force transmitting section 34, pressing surfaces 35 that press pressed surfaces 45 on both the end sides of the flat surface 41a are formed. The pressing surfaces 35 are inclined to approach the flat surface 41a toward the center portion from the inner circumferential arcuate surfaces 36 of the fixed section 31.

Figure 9B:
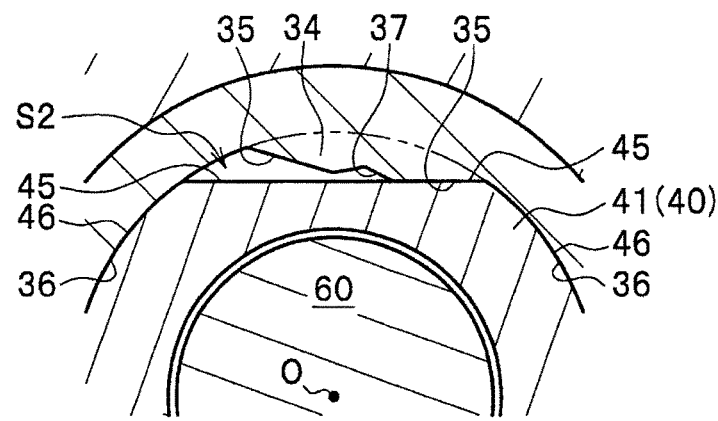
FIG. 9B is an enlarged view of the range surrounded by the frame line D in FIG. 6 in a state after the rotation of the input member and before the rotation of the output member.

Therefore, when the input member 30 rotates, as shown in FIG. 9B, the pressing surfaces 35 come into surface-contact with the pressed surfaces 45.

Figure 9C:
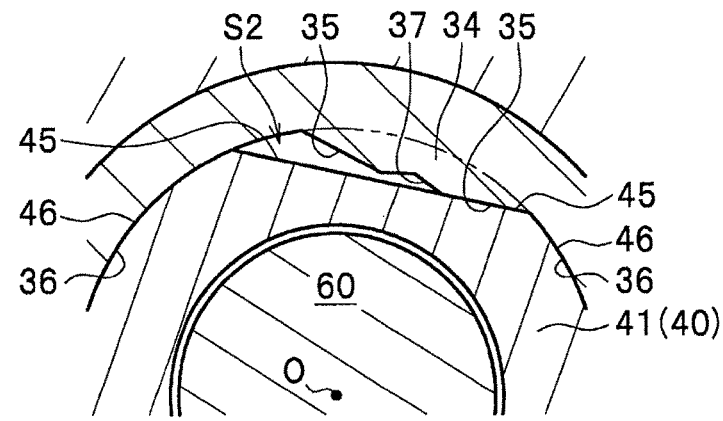
FIG. 9C is an enlarged view of the range surrounded by the frame line D in FIG. 6 in a state after the rotation of the input member and the output member.

When the input member 30 further rotates from the state in which the pressing surfaces 35 and the pressed surfaces 45 are in surface-contact with each other, the pressing surfaces press the pressed surfaces 45 in the circumferential direction. Consequently, as shown in FIG. 9C, the driving-force transmitted section 41 rotates and the driving force of the motor 10 is transmitted to the output member 40.

Note that, as shown in FIG. 9A, in a portion between the pressing surfaces 35 on the inner circumferential surface of the driving-force transmitting section 34, a recessed surface recessed to further separate from the flat surface 41a toward the center portion is formed. Portions other than the pressing surfaces 35 are prevented from coming into contact with the flat surface 41a.

As shown in FIG. 9A, when the driving force of the motor 10 is not transmitted to the input member 30, the pressing surfaces 35 and the pressed surfaces 45 separate from each other. A gap S2 is formed between the pressing surfaces 35 and the pressed surfaces 45.

The gap S2 is formed at a distance for allowing the pressing surfaces 35 to come into contact with the pressed surfaces 45 after the claws 33 turn in the circumferential direction according to the rotation of the input member 30 to press any one of the pairs of the pins 22 and 23 and the unrotatable state of the lock section 43 is released.

Figure 8B:
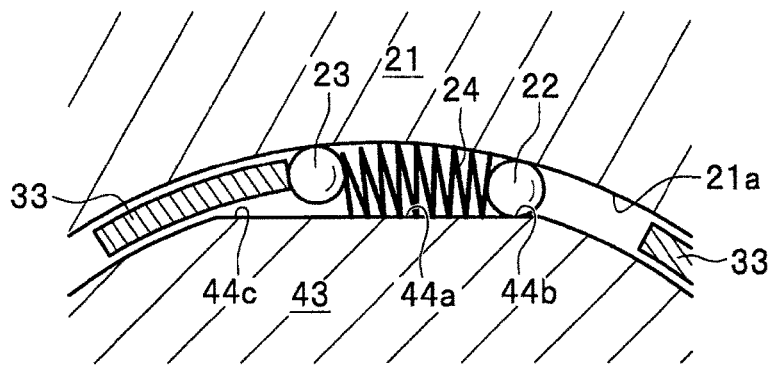
FIG. 8B is an enlarged view of the range surrounded by the frame line D in FIG. 6 in a state in which a right turn of the output member is released.

Therefore, for example, when the driving-force transmitting section 34 and the claws 33 turn in the right-turn direction according to the rotation of the input member 30, first, the claws 33 press the left side pins 22 and the lock section 43 changes to a rotatable state (see FIG. 8B). Then, the pressing surfaces 35 of the driving-force transmitting section 34 come into contact with the pressed surfaces 45 of the driving-force transmitted section 41 (see FIG. 9B).

When the input member 30 further rotates, as shown in FIG. 9C, the pressing surfaces 35 press the pressed surfaces 45 in the circumferential direction and the output member 40 rotates.

Figure 8C:
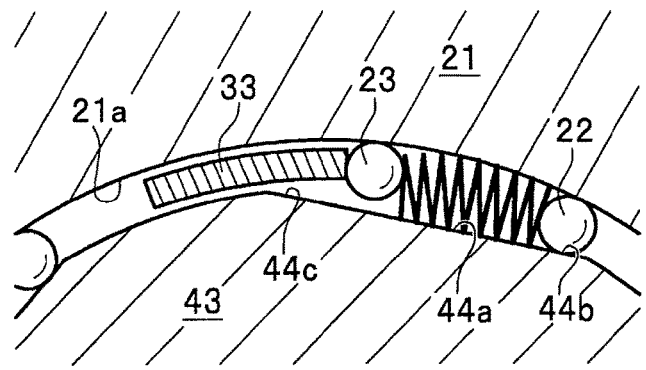
FIG. 8C is an enlarged view of a ranged surrounded by the frame line D in FIG. 6 in a state in which an unrotatable state a left turn of the output ember is maintained during rotation of the output member.

Note that, when both of the input member 30 and the output member 40 are rotating, as shown in FIG. 8C, the state in which the claws 33 press the left side pins 23 (the rotatable state) is maintained.

A relation between the cylindrical section 32 of the input member 30 and the axial support section 42 of the output member 40 is explained.

Figure 5:
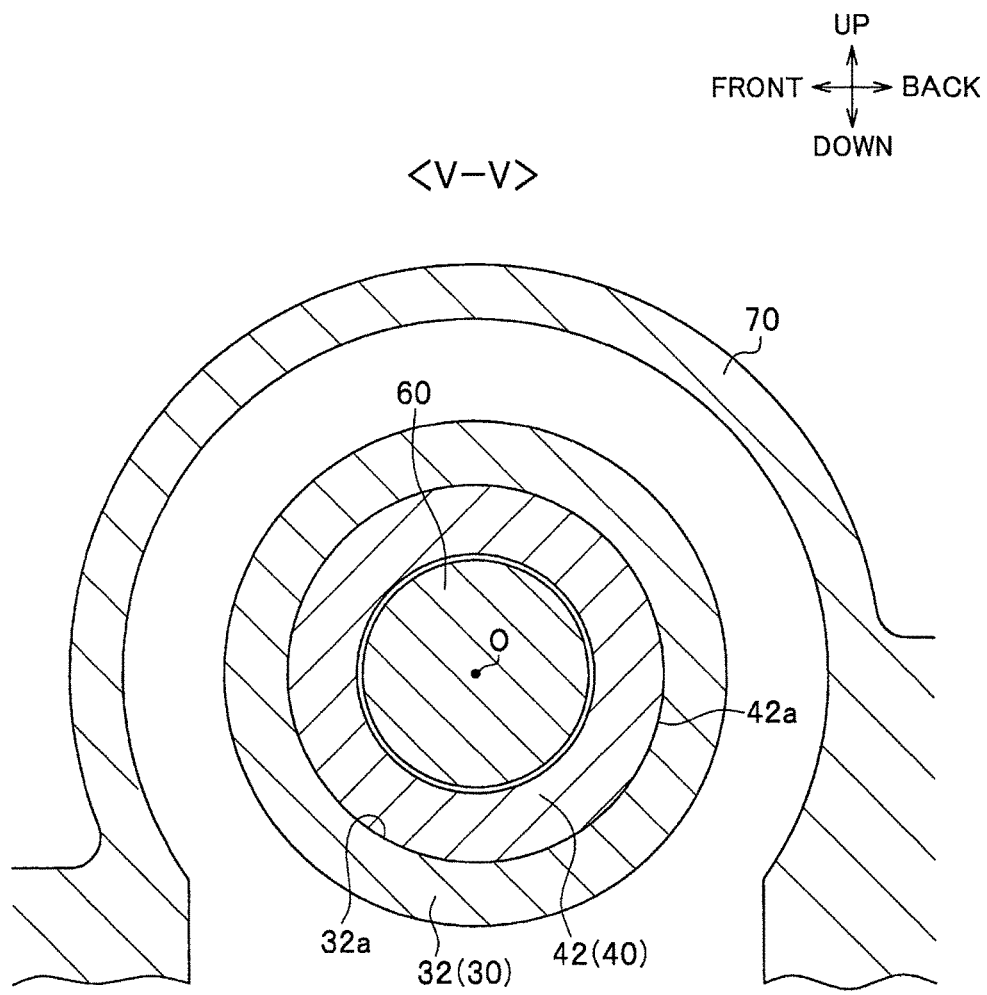
FIG. 5 is a V-V line arrow view of FIG. 3.

As shown in FIG. 5, the cylindrical section 32 assumes a cylindrical shape and includes a substantially circular inner circumferential surface 32a. An outer circumferential surface 42a of the axial support section 42 assumes a substantially circular shape. The inner diameter of the cylindrical section 32 and the outer diameter of the axial support section 42 are substantially the same.

Therefore, the input member 30 is turnably supported by the output member 40 in a state in which the rotation axes of the input member 30 and the output member 40 are coaxial.

When the driving force of the motor 10 is transmitted to the worm wheel 12 and the input member 30 and is not transmitted to the output member 40, while the inner circumferential surface 32a of the cylindrical section 32 slides on the outer circumferential surface 42a of the axial support section 42, the worm wheel 12 and the input member 30 turn about the output member 40.

The cylindrical section 32 slides on the outer circumferential surface 42a of the axial support section 42. However, since the lock section 43 is disabled to rotate by the pairs of pins 22 and 23, the output member 40 does not rotate.

When the driving force of the motor 10 is transmitted to the output member 40, that is, when the unrotatable state of the output member 40 is released and the pressing surfaces 35 of the driving-force transmitting section 34 press the pressed surfaces 45 of the driving-force transmitted section 41, the worm wheel 12, the input member 30, the output member 40, and the nut 51 rotate about the center axis O of the rod 60.

Note that, as shown in FIG. 9, the inner circumferential arcuate surfaces 36 of the fixed section 31 and the outer circumferential arcuate surfaces 46 of the driving-force transmitted section 41 are also formed in substantially the same diameters.

Therefore, during the turning of the input member 30, the inner circumferential arcuate surfaces 36 slide on the outer circumferential arcuate surfaces 46. The driving-force transmitted section 41 of the output member 40 also has a function of supporting the input member 30 rotatably about an axis of the input member 30.

The attaching section 80 is explained with reference to FIG. 4.

The attaching section 80 includes a lock nut 81 screwed in a screw groove formed on the outer circumferential surface of the output member 40, a spring sheet 82 provided further on the vehicle width direction outer side than the lock nut 81 and configured to urge the input member 30 to the vehicle width direction outer side, a first washer 83 disposed between the lock nut 81 and the spring sheet 82, a second washer 84 disposed between the spring sheet 82 and the fixed section 31 of the input member 30, and a third washer 85 disposed between the cylindrical section 32 of the input member 30 and the lock section 43 of the output member 40.

Consequently, since the input member 30 is urged by the spring sheet 82, in a state in which the input member 30 does not move in the axial direction of the output member 40 and relative turning of the input member 30 and the output member 40 is allowed, the input member 30 is attached to the output member 40.

Since the first washer 83 to the third washer 85 are interposed, the input member 30 and the output member 40 easily relatively turn.

As explained above, according to this embodiment, the nut 51 rotatably supported by the ball bearing 54 and the roller bearing 55 and the output member 40 are integrated. Therefore, a bearing that independently rotatably supports the output member 40 is unnecessary. The number of components decreases. Since the input member 30 and the worm wheel 12 are integrated, a bearing that independently rotatably supports the worm wheel 12 can be made unnecessary.

Further, according to this embodiment, the input member 30 is supported by the axial support section 42 of the output member 40 and the outer circumferential arcuate surface 46 of the driving-force transmitted section 41 rotatably about an axis of the input member 30. Therefore, a bearing itself that rotatably support the input member 30 is unnecessary.

That is, according to this embodiment, the bearings that support the worm wheel 12, the input member 30, and the output member 40 are unnecessary. Therefore, the number of components greatly decreases.

According to this embodiment, the worm wheel 12, the input member 30, the output member 40, and the nut 51 are centered to rotate about the center axis O of the rod 60 by the axial support section 42 of the output member 40 and the outer circumferential arcuate surface 46 of the driving-force transmitted section 41.

Therefore, vibration during the rotation of the worm wheel 12, the input member 30, the output member 40, and the nut 51 decreases and quietness is improved. A load on the ball bearing 54 and the roller bearing 55 that support the rotation of the worm wheel 12, the input member 30, the output member 40, and the nut 51 decreases. Therefore, it is possible to attain an increase in the life of the worm wheel 12, the input member 30, the output member 40, and the nut 51.

The embodiment is explained above. However, the present invention is not limited to the examples explained in the embodiment.

For example, the reverse input preventing device 20 in the embodiment includes the outer case 21 as the circular inner circumferential surface 21a opposed to the flat surface 44 of the lock section 43 of the output member 40. However, the circular inner circumferential surface 21a may be formed on the inner circumferential surface of the housing 70. Consequently, the outer case 21 can be made unnecessary.

In the embodiment, the driving-force transmitting section 34 that moves in the circumferential direction according to the rotation of the input member 30 is formed on the inner circumferential surface of the fixed section 31 of the input member 30. On the other hand, in the output member 40, the driving-force transmitted section 41 extending to the vehicle width direction inner side from the axial support section 42 and located on the track of the driving-force transmitting section 34 is formed. However, the present invention is not limited to this as long as the driving force of the motor 10 can be transmitted to the output member 40 from the input member 30.

In the embodiment, the converting device 50 is the ball screw including the nut 51, the screw shaft 52, and the plurality of balls 53. However, in the present invention, the converting device 50 may a feed screw.

In the example explained in the embodiment, as the rotation transmitting members for transmitting the rotation of the rotating shaft 10a of the motor 10 to the input member 30, the worm gear 11 and the worm wheel 12 are used. However, the present invention is not limited to this.

Examples of the rotation transmitting members other than the worm gear 11 and the worm wheel 12 include a belt and a pulley. Alternatively, the rotation of the rotating shaft 10a of the motor 10 may be transmitted to the input member 30 using a bevel gear. Besides, the direction of the rotating shaft 10a of the motor 10 may be set in the same direction as the input member 30 to transmit the rotation of the rotating shaft 10a of the motor 10 to the input member 30 with a spur gear.

When the rotation transmitting members other than the worm gear 11 and the worm wheel 12 are used, the input member and the rotation transmitting members are integrally formed. Consequently, it is possible to obtain effects same as the effects of the worm gear 11 and the worm wheel 12 explained in the embodiment.

EXPLANATION OF REFERENCE NUMERALS

1 Actuator
10 Motor
10a Rotating shaft
11 Worm gear (rotation transmitting member)
12 Worm wheel (rotation transmitting member)
20 Reverse input preventing device
21 Outer case
21a Inner circumferential surface
22, 23 Pins
24 Elastic bodies
25 Fixed screw
26 Lock nut
30 Input member
31 Fixed section
32 Cylindrical section
33 Claws 34 Driving-force transmitting section
35 Pressing surfaces
40 Output member
41 Driving-force transmitted section
42 Axial support section
43 Lock section
44 Flat surfaces
45 Pressed surfaces
50 Converting device
51 Nut
52 Screw shaft
53 Balls
54 Ball bearing
55 Roller bearing
60 Rod
70 Housing
80 Attaching section

What is claimed is:

1. An actuator comprising:
a motor comprising a rotating shaft;
a rotation transmitting member configured to transmit rotation of the rotating shaft;
a reverse input preventing device comprising an input member and an output member that rotate according to rotation of the rotation transmitting member, and configured to prevent external force inputs to the output member from being transmitted to the input member;
a converting device comprising a nut that rotates according to the rotation of the output member, and configured to convert a rotary motion of the nut into a linear motion; and
a rod configured to advance and retract according to the linear motion of the converting device, wherein
the input member and the rotation transmitting member are integrated with each other,
the output member and the nut are integrated with each other;
the input member comprises a cylindrical section having a substantially circular inner circumferential surface, and
the output member comprises an axial support section located at an inner side of the cylindrical section and configured to support the cylindrical section rotatably about an axis of the cylindrical section.

2. The actuator according to claim 1, wherein
the reverse input preventing device comprises:
the output member comprising a lock section having an outer circumferential surface on which a plurality of flat surfaces are formed;
an outer circumferential wall section on which a substantially circular inner circumferential surface surrounding an outer circumference of the lock section is formed;
a pair of pins disposed between each of the flat surfaces and the inner circumferential surface;
a plurality of elastic bodies each disposed between the pair of pins and configured to urge the pair of pins to separate from each other in a circumferential direction; and
the input member comprising a plurality of claws disposed between the outer circumferential wall section and the lock section to shift in the circumferential direction with respect to the plurality of flat surfaces,
each pair of pins pressed by the elastic body is sandwiched between the flat surface and the inner circumferential surface to disable turning of the output member, and
each of the claws that moves in the circumferential direction according to turning of the input member presses one of the pair of pins against urging force of the elastic body to allow the output member to turn.

3. The actuator according to claim 2, wherein
the input member comprises a driving-force transmitting section that moves in a circumferential direction,
the output member comprises a driving-force transmitted section located on a track of the driving-force transmitting section, and
the driving-force transmitted section and the driving-force transmitting section are separated from each other in the circumferential direction.

4. The actuator according to claim 1, wherein
the input member comprises a driving-force transmitting section that moves in a circumferential direction,
the output member comprises a driving-force transmitted section located on a track of the driving-force transmitting section, and
the driving-force transmitted section and the driving-force transmitting section are separated from each other in the circumferential direction.

5. An actuator comprising:
a motor comprising a rotating shaft;
a worm gear coupled to the rotating shaft;
a worm wheel meshed with the worm gear;
a reverse input preventing device comprising an input member and an output member that rotate according to rotation of the worm wheel, and configured to prevent external force inputs to the output member from being transmitted to the input member;
a converting device comprising a nut that rotates according to the rotation of the output member, and configured to convert a rotary motion of the nut into a linear motion; and
a rod configured to advance and retract according to the linear motion of the converting device, wherein
the input member and the worm wheel are integrated with each other,
the output member and the nut are integrated with each other;
the input member comprises a cylindrical section having a substantially circular inner circumferential surface, and
the output member comprises an axial support section located at an inner side of the cylindrical section and configured to support the cylindrical section rotatably about an axis of the cylindrical section.

6. The actuator according to claim 5, wherein
the reverse input preventing device comprises:
the output member comprising a lock section having an outer circumferential surface on which a plurality of flat surfaces are formed;
an outer circumferential wall section on which a substantially circular inner circumferential surface surrounding an outer circumference of the lock section is formed;
a pair of pins disposed between each of the flat surfaces and the inner circumferential surface;
a plurality of elastic bodies each disposed between the pair of pins and configured to urge the pair of pins to separate from each other in a circumferential direction; and the input member comprising a plurality of claws disposed between the outer circumferential wall section and the lock section to shift in the circumferential direction with respect to the plurality of flat surfaces, each pair of pins pressed by the elastic body is sandwiched between the flat surface and the inner circumferential surface to disable turning of the output member, and each of the claws that moves in the circumferential direction according to turning of the input member presses one of the pair of pins against urging force of the elastic body to allow the output member to turn.

7. The actuator according to claim 6, wherein the input member comprises a driving-force transmitting section that moves in a circumferential direction, the output member comprises a driving-force transmitted section located on a track of the driving-force transmitting section, and the driving-force transmitted section and the driving-force transmitting section are separated from each other in the circumferential direction.

8. The actuator according to claim 5, wherein the input member comprises a driving-force transmitting section that moves in a circumferential direction, the output member comprises a driving-force transmitted section located on a track of the driving-force transmitting section, and the driving-force transmitted section and the driving-force transmitting section are separated from each other in the circumferential direction.

9. A vehicle steering device comprising:

an actuator having a rod that advances and retracts the wheels of a vehicle, wherein the actuator comprises:

the rod;

a motor comprising a rotating shaft;

a rotation transmitting member configured to transmit rotation of the rotating shaft;

a reverse input preventing device comprising an input member and an output member that rotate according to rotation of the rotation transmitting member, and configured to prevent external force input to the output member from being transmitted to the input member; and a converting device comprising a nut that rotates according to the rotation of the output member, and configured to convert a rotary motion of the nut into a linear motion of the rod, the input member and the rotation transmitting member are integrated with each other, the output member and the nut are integrated with each other;

the input member comprises a cylindrical section having a substantially circular inner circumferential surface, and the output member comprises an axial support section located at an inner side of the cylindrical section and configured to support the cylindrical section rotatably about an axis of the cylindrical section.

* * * * *